United States Patent
Ono et al.

(10) Patent No.: US 12,384,309 B2
(45) Date of Patent: Aug. 12, 2025

(54) WIRE HARNESS AND WIRE HARNESS FIXING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masami Ono, Mie (JP); Satoshi Yamamoto, Mie (JP); Kaho Hayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 41 days.

(21) Appl. No.: 17/772,989

(22) PCT Filed: Oct. 20, 2020

(86) PCT No.: PCT/JP2020/039366
§ 371 (c)(1),
(2) Date: Apr. 28, 2022

(87) PCT Pub. No.: WO2021/090673
PCT Pub. Date: May 14, 2021

(65) Prior Publication Data
US 2024/0149803 A1    May 9, 2024

(30) Foreign Application Priority Data
Nov. 6, 2019 (JP) .................................. 2019-201351

(51) Int. Cl.
*B60R 16/02* (2006.01)
*B60N 2/06* (2006.01)
(Continued)

(52) U.S. Cl.
CPC ............ *B60R 16/0215* (2013.01); *B60N 2/06* (2013.01); *H02G 3/30* (2013.01); *H02G 11/00* (2013.01)

(58) Field of Classification Search
CPC ....... B60R 16/0215; B60R 16/02; B60N 2/06; B60N 2/02246; B60N 2/02253;
(Continued)

(56) References Cited

U.S. PATENT DOCUMENTS 8,226,145 B2 * 7/2012 Kasuya ............... B60R 16/0215
297/217.3
9,878,680 B2 * 1/2018 Mita .................... B60R 16/027
(Continued)

FOREIGN PATENT DOCUMENTS

CN    102862497 A  *  1/2013
CN    109291832 A  *  2/2019    ............... B60N 2/02
(Continued)

OTHER PUBLICATIONS

International Search Report issued on Dec. 28, 2020 for WO 2021/090673 A1 (4 pages).

*Primary Examiner* — Kimberly T Wood
(74) *Attorney, Agent, or Firm* — Venjuris, P.C.

(57) ABSTRACT

A wire harness 10 that is configured to be attached to a frame 18 disposed under a vehicle seat 12 includes a sheet member 40 attached to the frame 18 and a wire 14 fixed to the sheet member 40.

2 Claims, 8 Drawing Sheets

(51) Int. Cl.
*H02G 3/30* (2006.01)
*H02G 11/00* (2006.01)

(58) Field of Classification Search
CPC . H02G 3/30; H02G 11/00; H02G 3/04; H01B 7/00; H01B 7/40
See application file for complete search history.

(56) References Cited

U.S. PATENT DOCUMENTS

| | | | |
|---|---|---|---|
| 10,752,144 B2 * | 8/2020 | Kamei | B60N 2/5621 |
| 2004/0262963 A1 * | 12/2004 | Ali | B60N 2/002 |
| | | | 297/217.3 |
| 2007/0182226 A1 * | 8/2007 | Sakuma | B60N 2/7094 |
| | | | 297/217.3 |
| 2010/0027232 A1 | 2/2010 | Kasuya et al. | |

FOREIGN PATENT DOCUMENTS

| | | | | |
|---|---|---|---|---|
| JP | H01148947 U | * | 10/1989 | |
| JP | 2002019545 A | * | 1/2002 | |
| JP | 2007181296 A | * | 7/2007 | |
| JP | 2007276592 A | * | 10/2007 | |
| JP | 2010-018106 A | | 1/2010 | |
| JP | 5410041 B2 | * | 2/2014 | |
| JP | 2015-215077 A | | 12/2015 | |
| WO | WO-2011010402 A1 | * | 1/2011 | B60N 2/0264 |

* cited by examiner

WIRE HARNESS AND WIRE HARNESS FIXING STRUCTURE

CROSS REFERENCE TO RELATED APPLICATIONS

This application is a national phase of PCT application No. PCT/JP2020/039366, filed on 20 Oct. 2020, which claims priority from Japanese patent application No. 2019-201351, filed on 6 Nov. 2019, all of which are incorporated herein by reference.

TECHNICAL FIELD

The present disclosure relates to a wire harness and a wire harness fixing structure.

BACKGROUND

Conventional wire harnesses that are routed under vehicle seats have, for example, a structure in which a wire covered by a corrugated tube is routed in a routing space provided under a seat, as disclosed in Patent Document 1 below.

PRIOR ART DOCUMENT

Patent Document

Patent Document 1: JP 2010-036667A

SUMMARY OF THE INVENTION

Problems to be Solved

As vehicle seats have become increasingly sophisticated in recent years, the number of devices installed under a vehicle seat has increased, and the routing space for a wire harness has decreased. The increase in the number of devices has also lead to an increase in the number of wires, making the routing process of a wire harness more complicated.

The technology disclosed in the present specification has been made based on the above-described circumstances, and aims to provide a wire harness and a wire harness fixing structure that enable routing in a space-saving manner.

Means to Solve the Problem

A wire harness of the present disclosure is a wire harness configured to be attached to a frame disposed under a vehicle seat, the wire harness including a sheet member attached to the frame and a wire fixed to the sheet member.

Effect of the Invention

According to the present disclosure, the wire harness can be routed in a space-saving manner.

DETAILED DESCRIPTION TO EXECUTE THE INVENTION

Description of Embodiments of Present Disclosure

Figure 1:
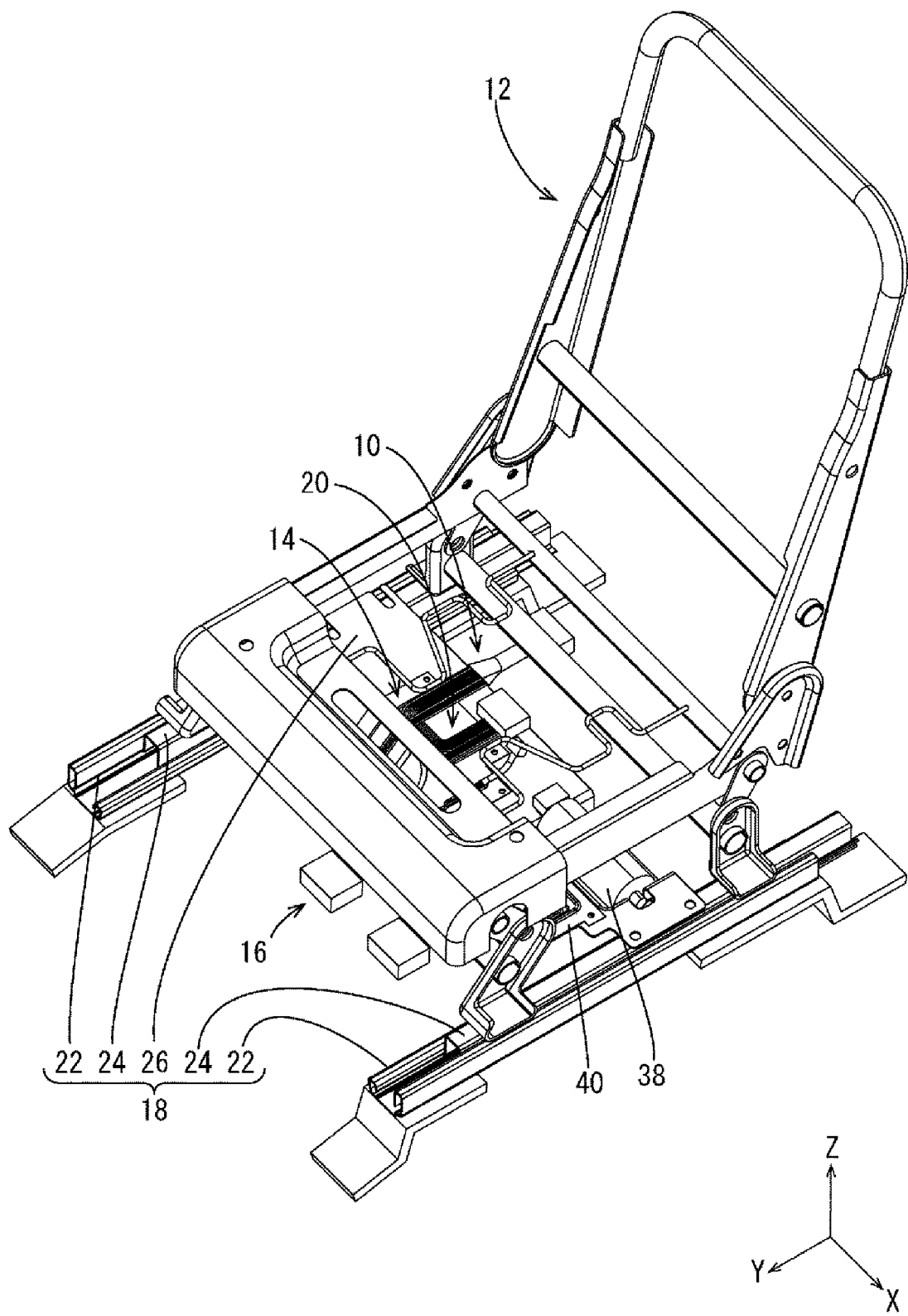
FIG. 1 is a front perspective view of a vehicle seat.

First, embodiments of the present disclosure will be listed and described. (1) A wire harness of the present disclosure is a wire harness configured to be attached to a frame disposed under a vehicle seat, the wire harness including a sheet member attached to the frame and a wire fixed to the sheet member.

Attaching the sheet member with the wire fixed thereto to the frame disposed under the vehicle seat makes it possible to reduce the routing space, compared with a conventional configuration in which, for example, a corrugated tube into which a wire is inserted is routed under a seat. Thus, the wire harness can be routed in a space-saving manner. In addition, the need to divert the wire harness around devices and the like provided under the seat while routing the wire harness is eliminated, and thus, the routing process of the wire harness can be simplified.

(2) Preferably, the frame includes a pair of sliding portions on which the vehicle seat is mounted and which enable the vehicle seat to slide and a skeletal frame that connects the pair of sliding portions to each other, and the sheet member is attached to the skeletal frame.

A sliding motor for sliding the vehicle seat may be attached to the skeletal frame. Attaching the sheet member with the wire fixed thereto to this skeletal frame makes it possible to increase the area of the sheet member, compared with a case in which a sheet member is fixed to, for example, a side surface or the like of a sliding portion, and thus, more wires can be fixed to the sheet member.

(3) Preferably, the skeletal frame includes a flat surface portion having a planar shape, and the sheet member is attached to the flat surface portion.

Providing the skeletal frame with the flat surface portion to which the sheet member can be attached makes it possible to easily attach the sheet member to the skeletal frame, and thus, the routing process of the wire harness can be simplified even more.

(4) Preferably, a first fixing hole is formed in the sheet member, a second fixing hole is formed at a position in the flat surface portion of the skeletal frame, the position corresponding to the first fixing hole, and a clip member for fixing the sheet member to the skeletal frame is inserted into the first fixing hole and the second fixing hole.

Fixing the sheet member to the flat surface portion of the skeletal frame using the clip member makes it possible to reliably prevent the sheet member from coming loose from the flat surface portion.

(5) Preferably, the wire includes a fixed portion that is fixed to the sheet member and a separated portion that is spaced apart from the sheet member and a distal end of which is connected to a connector, and an exterior member for protecting the separated portion is attached to the separated portion.

Providing the separated portion makes it possible to connect a device that is arranged in a position spaced apart from the sheet member to the wire. Also, attaching the exterior member to the separated portion makes it possible to protect the separated portion when a device or the like that may come into contact with the separated portion is provided in the surrounding region of the separated portion.

(7) The present disclosure may also relate to a wire harness fixing structure including the wire harness according to any one of the clauses (1) to (5) above and a frame disposed under a vehicle seat.

Details of Embodiments of Present Disclosure

Hereinafter, an embodiment of the present disclosure will be described. The present disclosure is not limited to the following examples, but rather is indicated by the scope of the claims, and is intended to include all modifications within the meaning and scope equivalent to the claims.

Embodiment

A wire harness 10 of the present disclosure will be described with reference to FIGS. 1 to 8. The wire harness 10 is connected to devices and the like related to a vehicle seat 12 (for example, a sliding motor 38, as well as a seat heater, a blower, a seat memory ECU, a reclining motor, an operating switch, and the like, which are not shown). In the following description, the direction X in FIG. 1 is defined as rightward in the left-right direction, the direction Y as forward in the front-rear direction, and the direction Z as upward in the vertical direction.

[Wire Harness 10]

Figure 2:
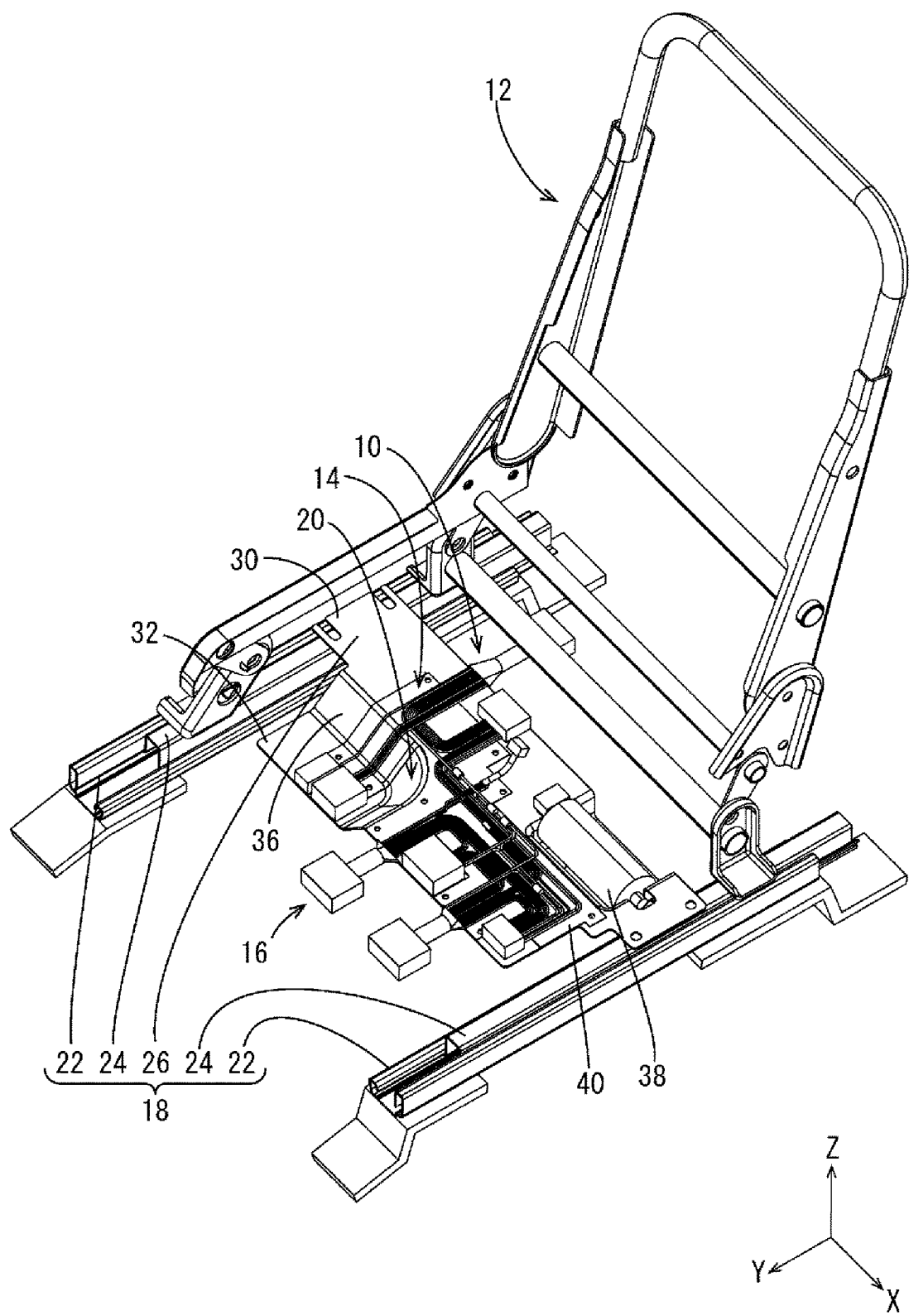
FIG. 2 is a front perspective view of the vehicle seat in a state in which some skeletal components of the vehicle seat have been removed.

As shown in FIGS. 1 and 2, the wire harness 10 includes a plurality of wires 14, a plurality of connectors 16, and a wire harness fixing structure 20 that is fixed to a frame 18 disposed under the vehicle seat 12. Note that, in the present disclosure, a cushion part of the vehicle seat 12 is not shown, and only a skeletal part of the vehicle seat 12 is shown.

[Frame 18, Rail Portions 22, Sliding Portions 24, and Skeletal Frame 26]

As shown in FIGS. 1 and 2, the frame 18 is constituted by metal members, and includes a pair of rail portions 22, a pair of sliding portions 24, and a skeletal frame 26.

As shown in FIGS. 1 and 2, the pair of rail portions 22 extend in the front-rear direction and are spaced apart from each other in the left-right direction. The pair of sliding portions 24 are respectively attached to the pair of rail portions 22. The sliding portions 24 have a rectangular tube shape elongated in the front-rear direction, and can slide on the corresponding rail portions 22 in the front-rear direction. The vehicle seat 12 is fixed to upper surfaces of the sliding portions 24. Therefore, the vehicle seat 12 can slide in the front-rear direction.

As shown in FIG. 2, the skeletal frame 26 extends in the left-right direction and connects the pair of sliding portions 24 to each other. As shown in FIGS. 3 to 5 and 7, the skeletal frame 26 includes a first flat surface portion 30 (an example of a flat surface portion), a second flat surface portion 32 (another example of the flat surface portion), and a motor accommodating portion 34.

[First Flat Surface Portion 30 and Second Flat Surface Portion 32]

Figure 3:
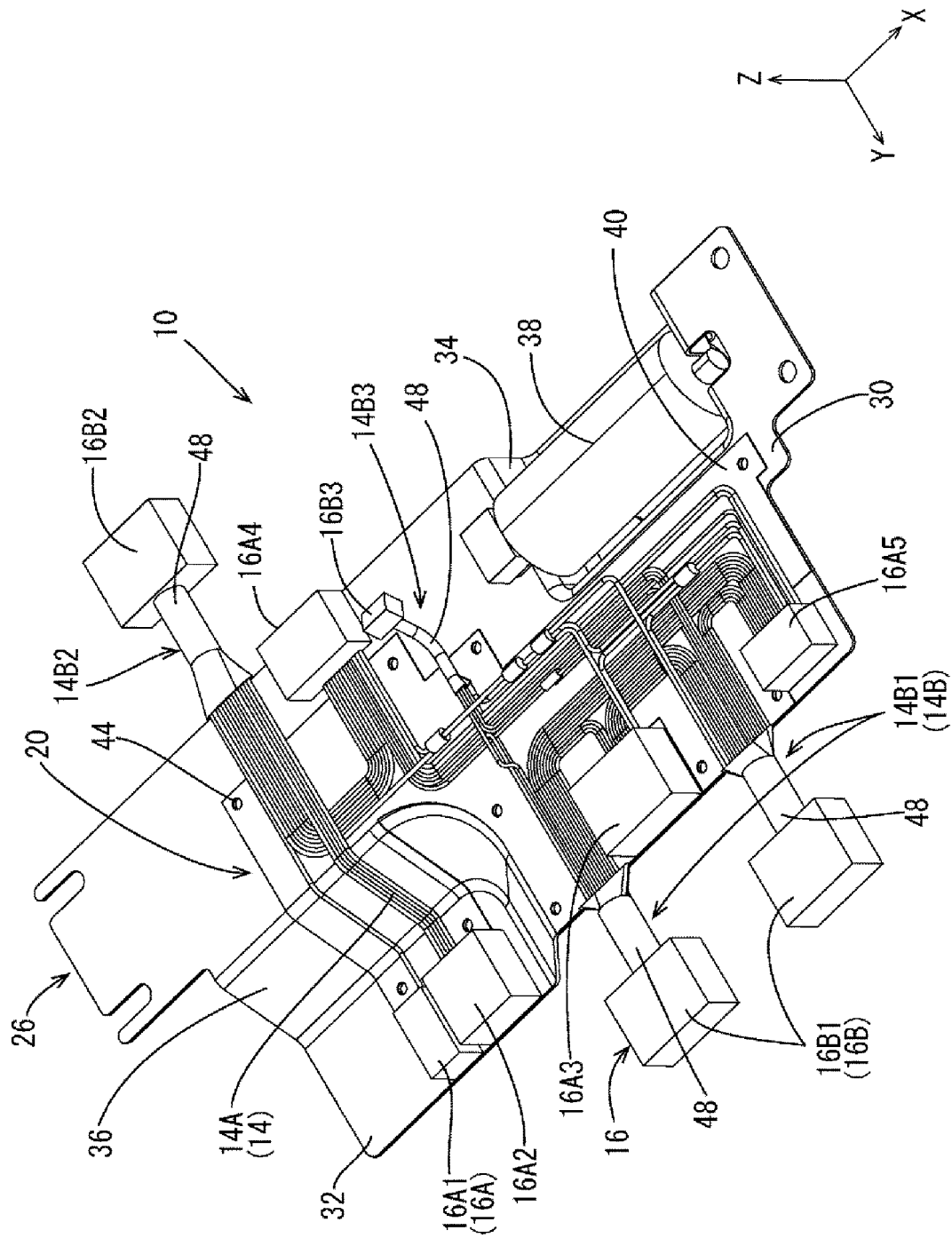
FIG. 3 is a front perspective view of a skeletal frame to which a wire harness is fixed.
Figure 4:
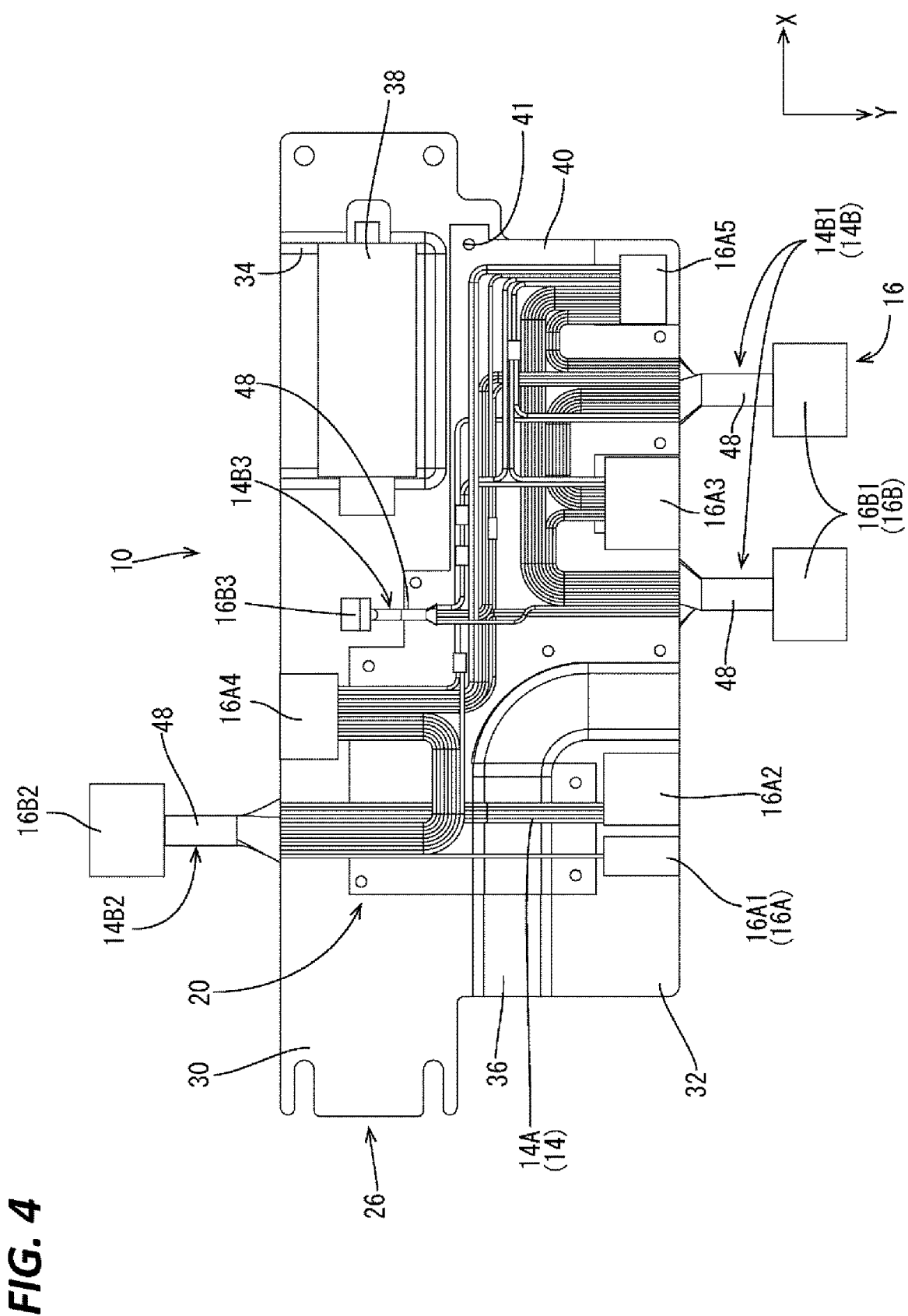
FIG. 4 is a plan view of the skeletal frame to which the wire harness is fixed.

As shown in FIG. 3, the first flat surface portion 30 has a flat plate-like shape elongated in the left-right direction, and, as shown in FIG. 2, left and right end portions of the first flat surface portion 30 are connected to the left and right sliding portions 24, respectively. Thus, the skeletal frame 26 is configured to be displaced in the front-rear direction as the vehicle seat 12 slides.

As shown in FIG. 3, the second flat surface portion 32 has a flat plate-like shape that is parallel to the first flat surface portion 30, and is connected to the first flat surface portion 30 via a sloping surface portion 36 that slopes downward. The motor accommodating portion 34 is shaped so as to be depressed downward from the first flat surface portion 30. The sliding motor 38 for sliding the vehicle seat 12 is accommodated in the motor accommodating portion 34.

Figure 5:
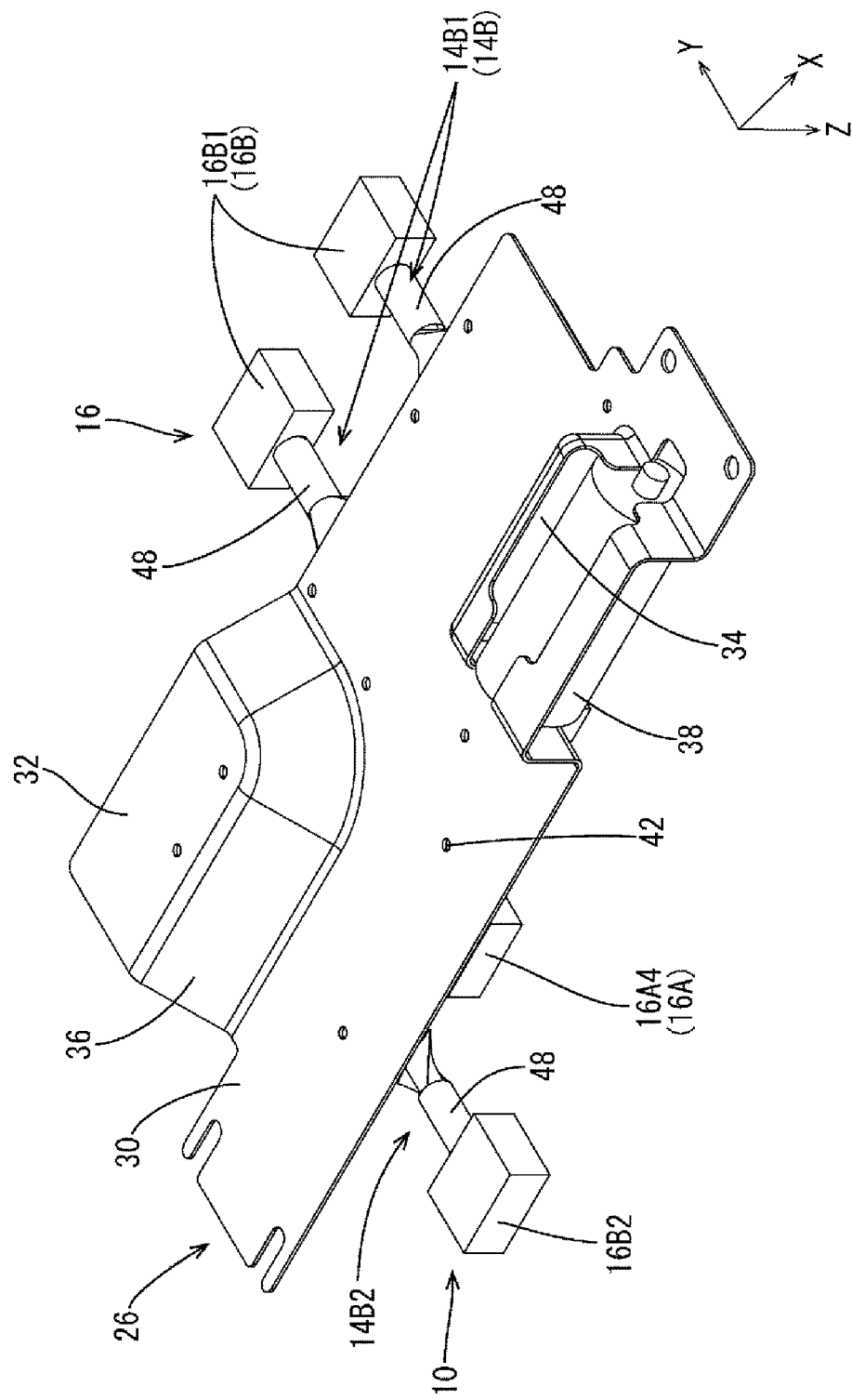
FIG. 5 is a rear perspective view of the skeletal frame to which the wire harness is fixed, as viewed from below.
Figure 7:
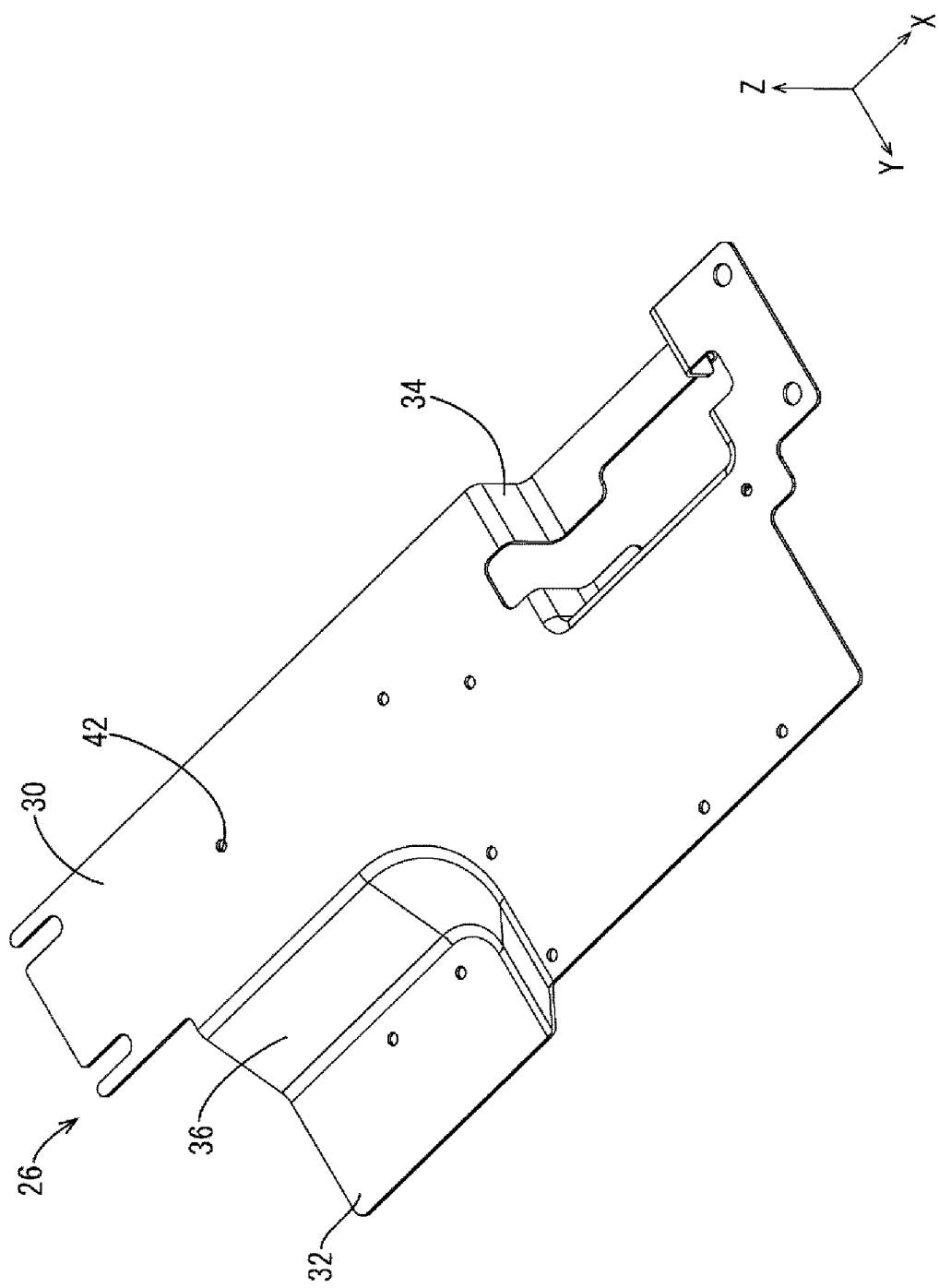
FIG. 7 is a front perspective view of the skeletal frame.

As shown in FIGS. 5 and 7, a plurality of second fixing holes 42 for fixing a sheet member 40, which will be described later, to the skeletal frame 26 are formed in the first flat surface portion 30 and the second flat surface portion 32, of the skeletal frame 26.

[Wire Harness Fixing Structure 20 and Sheet Member 40]

As shown in FIG. 3, the wire harness fixing structure 20 includes the sheet member 40. The sheet member 40 is made of a nonwoven fabric. The plurality of wires 14 are partly welded ultrasonically to a surface side of the sheet member 40 and fixed to the sheet member 40.

As shown in FIG. 3, the sheet member 40 is stuck and fixed onto the skeletal frame 26 over the first flat surface portion 30, the second flat surface portion 32, and the sloping surface portion 36. Here, the sheet member 40 is attached to the skeletal frame 26 using double-sided adhesive tape.

Figure 6:
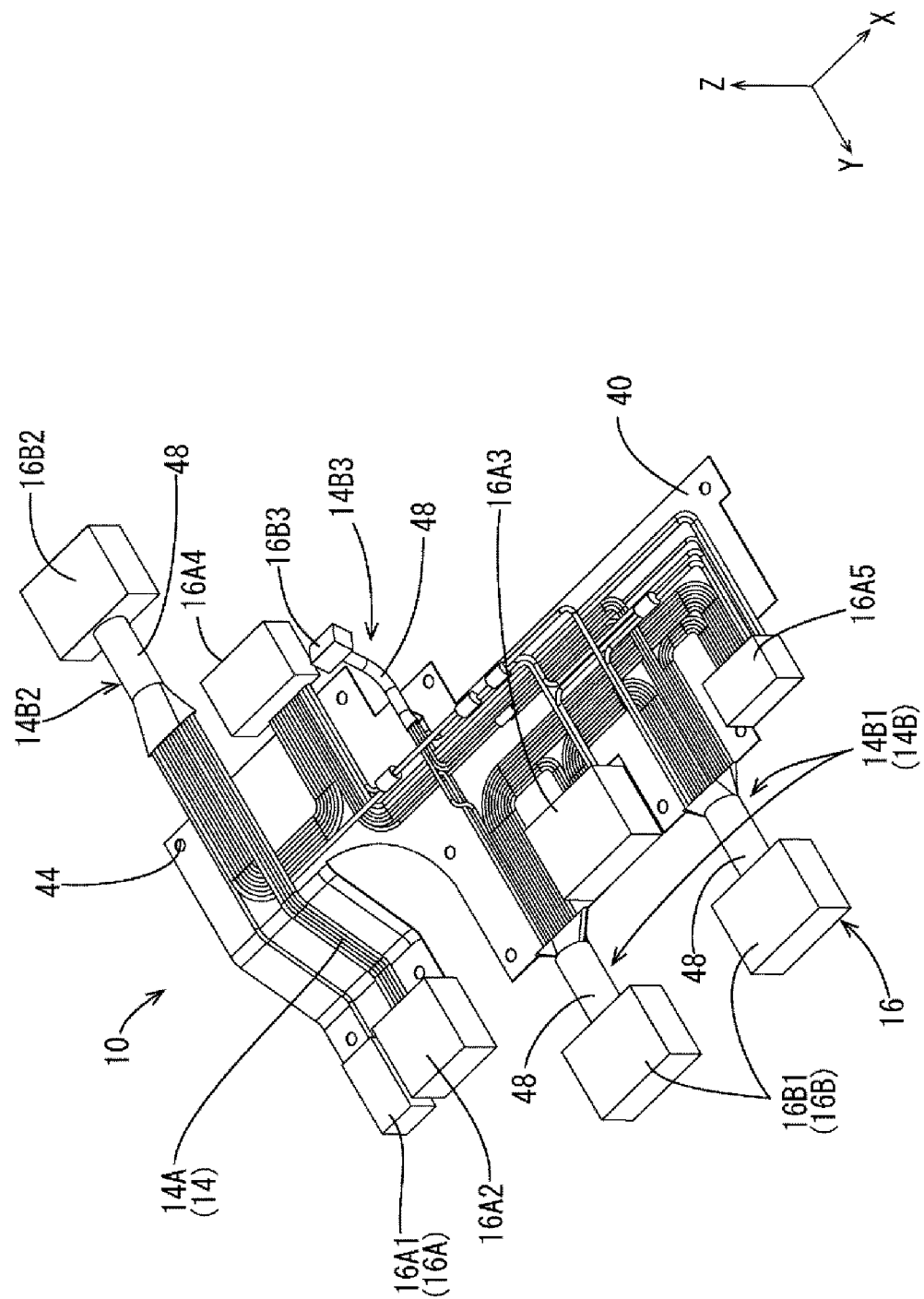
FIG. 6 is a front perspective view of the wire harness.

As shown in FIGS. 3 and 6, a plurality of first fixing holes 44 are formed in the sheet member 40. Each of the first fixing holes 44 in the sheet member 40 is provided at a position that corresponds to a respective second fixing hole 42 in the skeletal frame 26 when the sheet member 40 is attached to the skeletal frame 26.

[Clip Members 46]

Figure 8:
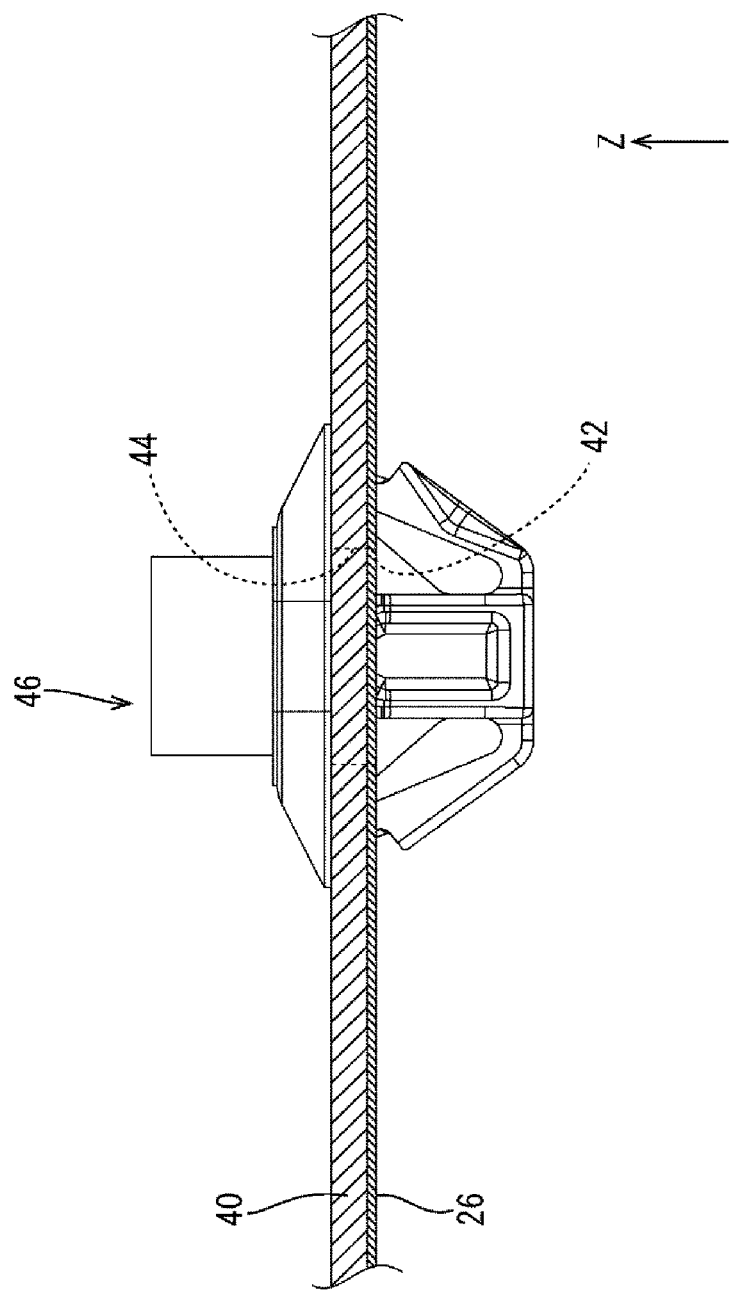
FIG. 8 is a diagram illustrating a structure for fixing a sheet member to the skeletal frame using a clip member.

As shown in FIG. 8, a clip member 46 is inserted, from above, into the second fixing hole 42 of the skeletal frame 26 and the first fixing hole 44 of the sheet member 40. Thus, the sheet member 40 can be reliably fixed to the skeletal frame 26. Note that, although FIG. 8 shows a state in which a clip member 46 is inserted into a single first fixing hole 44 and a single second fixing hole 42, clip members 46 are also inserted into the other first fixing holes 44 and second fixing holes 42.

[Connectors 16, On-Frame Connectors 16A, and Separated Connectors 16B]

As shown in FIG. 3, the plurality of connectors 16 include on-frame connectors 16A that are arranged on the skeletal frame 26 while facing the skeletal frame 26 and separated connectors 16B that are arranged in positions spaced apart from the skeletal frame 26. Terminals, which are not shown, are accommodated inside the on-frame connectors 16A and the separated connectors 16B, and ends of the wires 14 are connected to the terminals accommodated in the connectors 16.

As shown in FIG. 3, three on-frame connectors 16A are arranged on the first flat surface portion 30 of the skeletal frame 26, and two on-frame connectors 16A are arranged on the second flat surface portion 32.

W to W (Wire-to-Wire) connectors (not shown) of a vehicle body-side harness are connected to a first on-frame connector 16A1 and a second on-frame connector 16A2 that are arranged on the second flat surface portion 32, of the on-frame connectors 16A. Also, a W to W (Wire-to-Wire) connector of a vehicle body-side harness is connected to a third on-frame connector 16A3 that is arranged on a front end portion of the first flat surface portion 30, of the on-frame connectors 16A.

As shown in FIG. 3, a W to W connector of a wire harness (seat-back-side harness) that is routed in a rear portion of the vehicle seat 12 is connected to an on-frame connector 16A4 that is arranged on a rear end portion of the first flat surface portion 30, of the on-frame connectors 16A. Also, a connector (not shown) for an operating switch of the vehicle seat 12 is connected to a fifth on-frame connector 16A5 that is arranged on a front end portion of the first flat surface portion 30.

As shown in FIG. 3, the plurality of separated connectors 16B are connected to devices that are arranged in positions spaced apart from the skeletal frame 26, via separated portions 14B of the wires 14, which will be described later.

Of the separated connectors 16B, a pair of left and right first separated connectors 16B1 that are located forward of the skeletal frame 26 are connected to a seat memory ECU (Electronic Control Unit), which is not shown.

Of the separated connectors 16B, a second separated connector 16B2 that is located rearward of the skeletal frame 26 is connected to a unit (not shown) for controlling a seat heater or the like.

Of the separated connectors 16B, a third separated connector 16B3 that is located above the skeletal frame 26 is connected to the sliding motor 38. Note that, in FIG. 3, the third separated connector 16B3 is not connected to the sliding motor 38.

[Wires 14, Fixed Portions 14A, and Separated Portions 14B]

As shown in FIGS. 3 and 6, the plurality of wires 14 have fixed portions 14A that are fused and fixed to the sheet member 40, and separated portions 14B that are spaced apart from the sheet member 40 and connected to the separated connectors 16B.

As shown in FIGS. 3 and 6, for each wire bundle that is connected to corresponding connectors 16, the fixed portions 14A are arranged side by side on the sheet member 40 and fixed to the sheet member 40. The separated portions 14B include a pair of first separated portions 14B1, a second separated portion 14B2, and a third separated portion 14B3.

The pair of first separated portions 14B1 extend from a front edge of the first flat surface portion 30 of the skeletal frame 26 toward the pair of first separated connectors 16B1, and their ends are connected to the terminals (not shown) accommodated in the pair of first separated connectors 16B1.

The second separated portion 14B2 extends from a rear edge of the first flat surface portion 30 of the skeletal frame 26 toward the second separated connector 16B2, and its end is connected to the terminal (not shown) accommodated in the second separated connector 16B2.

The third separated portion 14B3 extends upward from the rear edge of the first flat surface portion 30 of the skeletal frame 26, and its end is connected to the terminal (not shown) accommodated in the third separated connector 16B3.

As shown in FIGS. 3 and 6, exterior members 48 are attached to the respective separated portions 14B (the first separated portions 14B1, the second separated portion 14B2, and the third separated portion 14B3). The exterior members 48 are made of a nonwoven fabric as is the case with the sheet member 40, and are fixed in a state in which they are wrapped around the respective separated portions 14B so as to cover outer circumferences thereof.

In a state (state shown in FIG. 3) in which the sheet member 40 with the wires 14 fused thereto is attached to the skeletal frame 26, another sheet member (not shown) is stuck to the skeletal frame 26 from above so as to cover the wires 14. As a result, the wires 14 fused to the flat surface portions 30 and 32 can no longer be seen from the outside, and the wires 14 can be protected.

Effects of Embodiment

The wire harness 10 of the present embodiment is a wire harness 10 configured to be attached to a frame 18 disposed under a vehicle seat 12, and includes a sheet member 40 attached to the frame 18 and a wire 14 fixed to the sheet member 40.

According to the present embodiment, attaching the sheet member 40 with the wire 14 fixed thereto to the frame 18 disposed under the vehicle seat 12 makes it possible to reduce the routing space, compared with a conventional configuration in which, for example, a corrugated tube into which a wire is inserted is routed under a seat. Thus, the wire harness 10 can be routed in a space-saving manner. In addition, the need to divert the wire harness 10 around the devices provided under the seat while routing the wire harness 10 is eliminated, and thus, the routing process of the wire harness 10 can be simplified.

Furthermore, the frame 18 includes a pair of sliding portions 24 on which the vehicle seat 12 is mounted and which enable the vehicle seat 12 to slide and a skeletal frame 26 that connects the pair of sliding portions 24 to each other, and the sheet member 40 is attached to the skeletal frame 26.

A sliding motor 38 for sliding the vehicle seat 12 may be attached to the skeletal frame 26. Attaching the sheet member 40 with the wire 14 fixed thereto to this skeletal frame 26 makes it possible to increase the area of the sheet member 40, compared with a case in which a sheet member is fixed to, for example, a side surface or the like of a sliding portion, and thus, more wires 14 can be fixed to the sheet member 40. In addition, since a large current is required in order to slide the vehicle seat 12, the present embodiment is particularly effective in that it enables more wires 14 to be fixed to the sheet member 40.

Furthermore, the skeletal frame 26 includes flat surface portions 30 and 32 having a planar shape, and the sheet member 40 is attached to the flat surface portions 30 and 32.

Providing the skeletal frame 26 with the flat surface portions 30 and 32 to which the sheet member 40 can be attached makes it possible to easily attach the sheet member 40 to the skeletal frame 26 by performing the operation of laying down and spreading out the sheet member 40 on the flat surface portions 30 and 32, and thus, the routing process of the wire harness 10 can be simplified even more.

Furthermore, first fixing holes 44 are formed in the sheet member 40, second fixing holes 42 are formed at positions in the flat surface portions 30 and 32 of the skeletal frame 26, the positions corresponding to the respective first fixing holes 44, and clip members 46 for fixing the sheet member 40 to the skeletal frame 26 are inserted into the first fixing holes 44 and the second fixing holes 42.

Fixing the sheet member 40 to the flat surface portions 30 and 32 of the skeletal frame 26 using the clip members 46 makes it possible to reliably prevent the sheet member 40 from coming loose from the flat surface portions 30 and 32.

Furthermore, the wire 14 includes a fixed portion 14A that is fixed to the sheet member 40, a separated portion 14B that is spaced apart from the sheet member 40 and a distal end of which is connected to a connector, and an exterior member 48 for protecting the separated portion 14B is attached to the separated portion 14B.

Providing the separated portion 14B makes it possible to connect a device or the like that is arranged in a position spaced apart from the sheet member 40 to the wire 14. Also, attaching the exterior member 48 to the separated portion 14B makes it possible to protect the separated portion 14B when a device or the like that may come into contact with the separated portion 14B is provided in the surrounding region of the separated portion 14B.

Furthermore, a wire harness fixing structure 20 includes the wire harness 10 and the frame 18 that is disposed under the vehicle seat 12.

Other Embodiments

The present disclosure is not limited to the embodiment described above and in the drawings, and for example, embodiments such as the following are also included in the technical scope of the technology disclosed in the present specification.

(1) In the foregoing embodiment, a configuration has been described in which the sheet member 40 is made of a nonwoven fabric. However, the present disclosure is not limited to this configuration. For example, the sheet member may be made of a woven fabric, or a synthetic resin processed into a sheet shape.

(2) In the foregoing embodiment, a configuration has been described in which the sheet member 40 is fixed to the skeletal frame 26 by inserting the clip members 46 into the first fixing holes 44 and the second fixing holes 42. However, the present disclosure is not limited to this configuration. For example, a configuration may also be adopted in which the clip members are spring clips, and the sheet member is fixed to the skeletal frame by the spring clips sandwiching the sheet member and the skeletal frame.

(3) In the foregoing embodiment, a configuration has been described in which the exterior member 48 of the separated portion 14B is made of a nonwoven fabric as is the case with the sheet member 40. However, the present disclosure is not limited to this configuration. A configuration may also be adopted in which another type of exterior member, such as a corrugated tube, is used as the exterior member. In addition, if no object that may come into contact with the separated portion is located in the surrounding region of the path of the separated portion, a configuration may be adopted in which no exterior member is attached to the separated portion.

(4) In the foregoing embodiment, a configuration has been described in which the wire 14 is fixed to the sheet member 40 through ultrasonic welding. However, the present disclosure is not limited to this configuration. For example, a configuration may also be adopted in which the wire is fixed to the sheet member via an adhesive.

LIST OF REFERENCE NUMERALS

10 Wire harness
12 Vehicle seat
14 Wire
14A Fixed portion
14B Separated portion
14B1 First separated portion
14B2 Second separated portion
14B3 Third separated portion
16 Connector
16A On-frame connector
16A1 First on-frame connector
16A2 Second on-frame connector
16A3 Third on-frame connector
16A4 Fourth on-frame connector
16A5 Fifth on-frame connector
16B Separated connector
16B1 First separated connector
16B2 Second separated connector
16B3 Third separated connector
18 Frame
20 Wire harness fixing structure
22 Rail portion
24 Sliding portion
26 Skeletal frame
30 First flat surface portion (Flat surface portion)
32 Second flat surface portion (Flat surface portion)
34 Motor accommodating portion
36 Sloping surface portion
38 Sliding motor
40 Sheet member
42 Second fixing hole
44 First fixing hole
46 Clip member
48 Exterior member

What is claimed is:

1. A wire harness fixing structure comprising:
a pair of sliding portions on which a vehicle seat may be mounted and which enable the vehicle seat to slide;
a skeletal frame including a flat surface portion having a planar shape, the flat surface portion connecting the pair of sliding portions to each other;
a sheet member attached to the flat surface portion of the skeletal frame; and
a wire connected to the sheet member, wherein;
the sheet member is disposed so as to fit within an outer peripheral edge of the skeletal frame in a plan view;
a first fixing hole is formed in the sheet member;
a second fixing hole is formed at a position in the flat surface portion of the skeletal frame, the position corresponding to the first fixing hole; and
a clip member for fixing the sheet member to the skeletal frame is inserted into the first fixing hole and the second fixing hole.

2. The wire harness fixing structure according to claim 1, wherein
the wire includes
a fixed portion that is fixed to the sheet member and
a separated portion that is spaced apart from the sheet member and a distal end of which is connected to a connector, and
an exterior member for protecting the separated portion is attached to the separated portion.

* * * * *